United States Patent [19]

Gross

[11] 4,138,707
[45] Feb. 6, 1979

[54] GROUND FAULT PROTECTIVE SYSTEMS WITH PREDETECTION NEUTRALIZATION OF REACTIVE CURRENTS

[76] Inventor: Thomas A. O. Gross, Lincoln, Mass. 01773

[21] Appl. No.: 817,579

[22] Filed: Jul. 21, 1977

[51] Int. Cl.² .............................................. H02H 3/28
[52] U.S. Cl. ...................................... 361/45; 361/44; 361/87
[58] Field of Search ....................... 361/44, 45, 46, 47, 361/49, 42, 87

[56] References Cited

U.S. PATENT DOCUMENTS

| | | | |
|---|---|---|---|
| 1,956,461 | 4/1934 | Butow | 361/44 |
| 2,357,138 | 8/1944 | Seeley | 361/47 |
| 3,555,360 | 1/1971 | Lee et al. | 361/45 |
| 3,617,809 | 11/1971 | Penn et al. | 361/45 |
| 3,710,190 | 1/1973 | Althoff | 361/44 |
| 3,732,463 | 5/1973 | Dale | 361/45 |
| 3,769,548 | 10/1973 | Pardue | 361/45 |
| 3,848,159 | 11/1974 | Nye et al. | 361/45 |
| 3,859,567 | 1/1975 | Allard | 361/45 |
| 3,976,918 | 8/1976 | Clark | 361/45 |
| 4,024,435 | 5/1977 | Gross | 361/45 |
| 4,056,837 | 11/1977 | Misencik et al. | 361/45 |

FOREIGN PATENT DOCUMENTS 647533 7/1937 Fed. Rep. of Germany ............ 361/44

Primary Examiner—Patrick R. Salce
Attorney, Agent, or Firm—William D. Roberson

[57] ABSTRACT

Ground fault protective systems are disclosed in which fault signals are generated in response to differential currents carried by electrical supply lines. A circuit breaker interrupts power on the supply lines when the fault signals exceed a given magnitude and duration. Downstream reactances to ground from one or more supply lines give rise to spurious fault signals which do not characterize true ground fault conditions. These spurious fault signals are cancelled prior to detection by means of neutralizing auxiliary circuits. The resulting fault signals exhibit a high signal-to-noise ratio.

12 Claims, 7 Drawing Figures

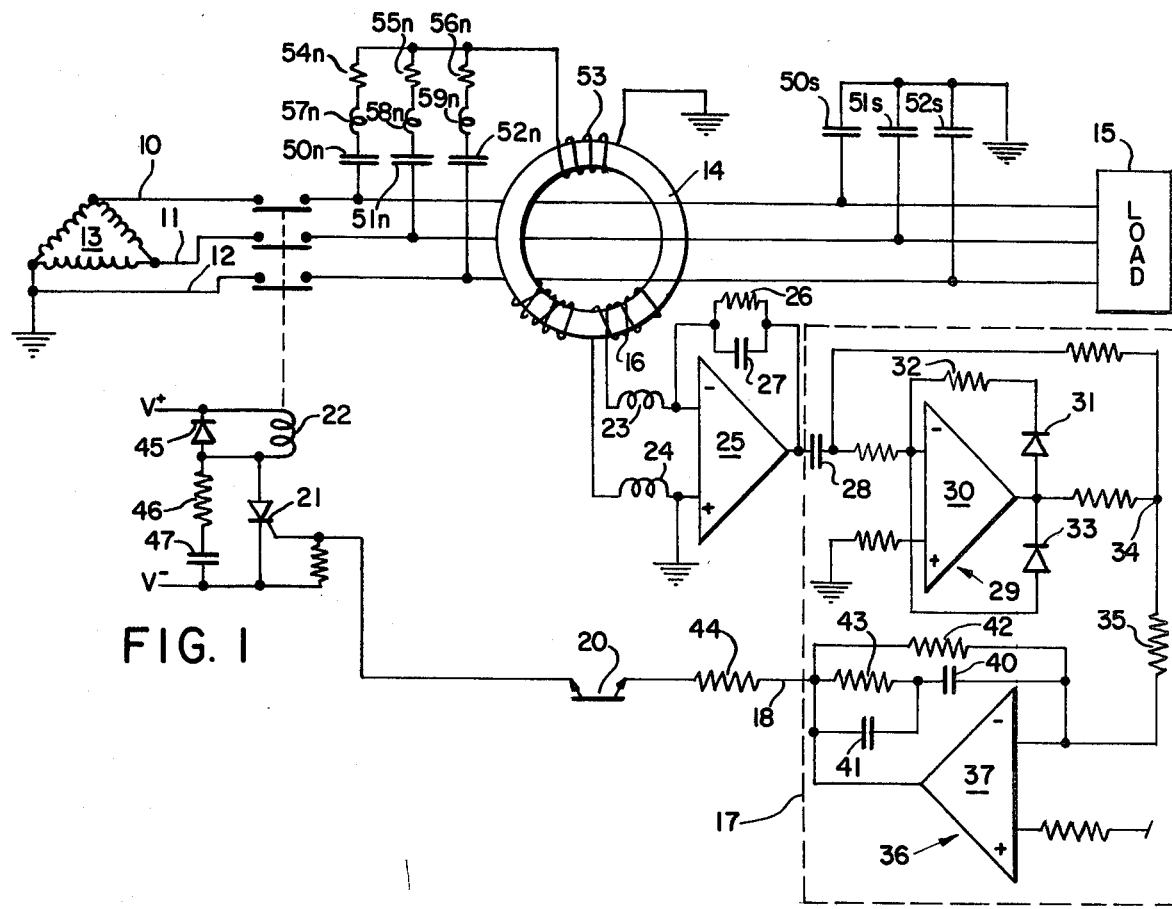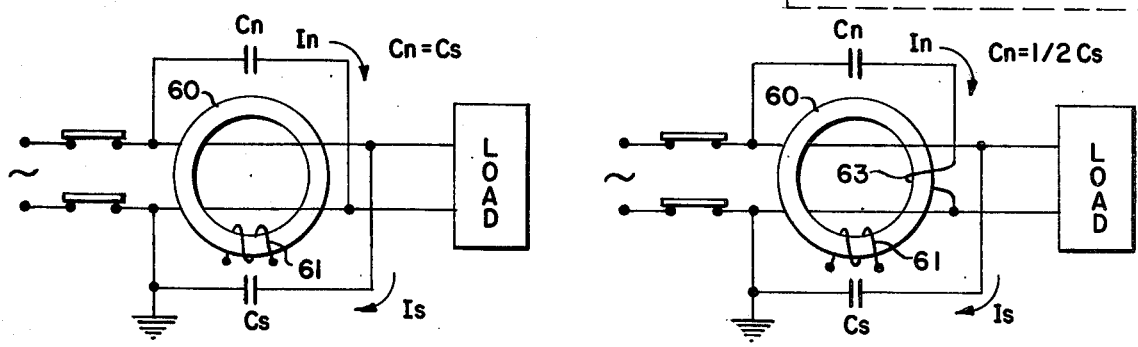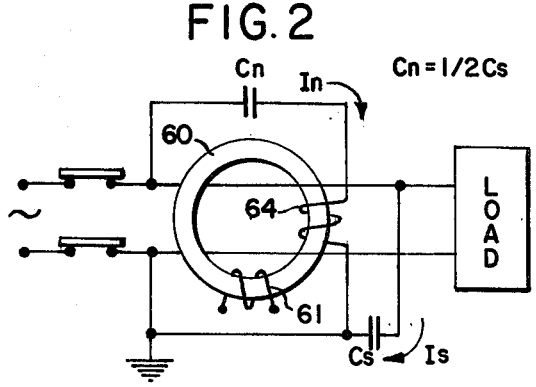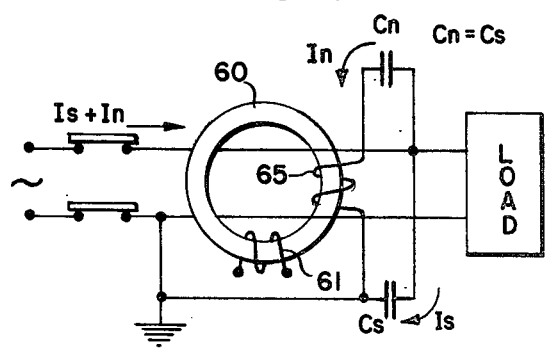
FIG. 1
FIG. 2
FIG. 3
FIG. 4
FIG. 5

GROUND FAULT PROTECTIVE SYSTEMS WITH PREDETECTION NEUTRALIZATION OF REACTIVE CURRENTS

BACKGROUND

Ground fault protective systems are intended to sense small differences in current in power lines which normally carry balanced currents. These differences in current may be caused by leakages of current from one of the line conductors to ground, thus depriving the neutral line of some of its normal current which would establish a balance, or zero difference in current, in the lines at the sensor. If the differential currents are below certain predetermined levels, power should normally be allowed to flow uninterrupted. If differential currents should occur which exceed predetermined minima for a long enough time, the circuit should be interrupted, since it is then probable that a malfunction of insulation or perhaps even a serious shock to a human being is occurring.

In practical field use of ground fault interrupters it is often possible for spurious signals to be confused with real fault currents. For example, power line transients due to sudden load changes or to lightninginduced surges can give rise to nuisance tripping in ground fault interrupter systems. Intolerance to frequent nuisance tripping can cause the users of such equipment to establish sensitivity specifications at dangerously high levels. A steady-state spurious signal frequently encountered is a capacitive current to ground from at least one of the downstream power lines. This can be caused by a long cable to the load, or by discrete capacitors such as those used to avoid radio frequency interference, or by similar circuit influences having nothing to do with a true fault on the line. The minimization of nuisance tripping in ground fault interrupter systems by discriminating against reactive currents, spurious transients or other electrical signals having a wave form which does not correspond to or correlate in phase with the line voltage is addressed in my U. S. Pat. No. 3,723,814, issued Mar. 27, 1973 and entitled "Phase-Sensitive Ground Fault Protective Systems."

The term "nuisance tripping" implies, of course, that interruption of the circuit is brought about by the ground fault detector and interrupter system for causes which prove to be insufficient, that the system responds to electrical conditions by needlessly breaking the circuit without the occurrence of a true fault. A true ground fault can have different causes and can give rise to different levels of current imbalance in the supply conductors. If the current imbalance is comparatively high; that is to say, if a comparatively large ground fault current flows, the system should respond quickly and decisively. But if the current imbalance in the supply lines is comparatively small, it is not necessarily desirable for the system to respond as quickly to the signal condition. Under such circumstances the decision to interrupt the supply circuit can be deferred, in a manner of speaking, to permit the system more time to test whether the current imbalance in the supply conductors is a short-term anomaly or a longer term effect representing an actual or incipient ground fault.

In my U. S. Pat. No. 4,024,435 issued on May 17, 1977, "Ground Fault Protective Systems with Variable Rate Integration of Fault Signals" I have demonstrated the importance of integrating ground fault signals at variable rates to minimize the occurrence of nuisance tripping, while perserving the ability of a protective system to respond effectively to ground fault currents as small as 5 milliamperes.

In a typical situation involving possible electrocution of an individual completing a ground fault circuit through his own body, death does not occur instantaneously, but results most often from ventricular fibrillation. The higher the electrocuting current is, the shorter the time in which ventricular fibrillation occurs. The "let-go" current level above which a person experiencing an electrical shock cannot voluntarily release his hold in a physical object through which he received the shock varies according to a number of factors. These variable factors include the weight of the person. Larger people exhibit higher let-go currents. The let-go current for most people is between 10 and 16 ma. But the lower limit of let-go current seems to be 6 ma., at which current level 0.5% of women cannot let go of the object through which they are experiencing electrical shock.

This underscores the importance of preserving the ability of a ground fault protective system to respond to true fault currents as low as 5 milliamperes. Nevertheless it is not at all uncommon for certain electrical systems, particularly those with long power cables connecting the load, to exhibit normal capacitive currents much larger than those which are capable of electrocuting a person. A ground fault protective system sufficiently sensitive to protect human life can be tripped by such differential capacitive currents.

INTRODUCTION

According to this invention the effect on a differential current sensor of a known downstream reactive current to ground is offset, neutralized or counterbalanced by an equal and opposite effect to prevent the detector from responding to that reactive current. In a given installation wherein at least one of the supply conductors has a fixed and premeasurable stray capacitance to ground, the resulting capacitive current to ground on that supply conductor may be many times larger than a true resistive ground fault current.

The embodiments of the invention described here employ a detector or demodulator followed by a signal integrator in order to achieve a high sensitivity to real faults with a minimum of nuisance tripping. The methods of neutralization considered here are based upon pre-detection cancellation of those pseudo-fault signals which are generated by shunting reactances to ground — usually capacitive — downstream of the differential current sensor.

Post-detection cancellation techniques could not work as reliably. Once the fault signal, whether pseudo or real, is detected its phase information is lost; all that remains is a scalar amplitude. In the absence of a real fault, if a detector output sufficient to trip a circuit breaker were to persist, this output might be cancelled with a suitable voltage. One difficulty with post-detection cancellation is that the system is rendered relatively insensitive to real faults. For example assume that a real fault current of 5 ma is superimposed on a pseudo-fault current of 50 ma. The combined fault signal becomes 50.25 ma by quadrature addition. If the real fault doubles from 5 to 10 ma the combined fault signal becomes 50.99 ma which is less than 1.5% larger. Such small signal changes cannot be detected reliably without nuisance alarms.

With pre-detection neutralization, on the other hand, the pseudo-fault signals are cancelled by vector subtraction. Once the reactive signal component has been reduced to a few milliamperes or less, a two-fold change in the real fault signal appears with substantially a two-fold change in the combined fault signal. In one embodiment the resulting effective ampere turns in the differential current sensor due to the known downstream capacitance are neutralized by an auxiliary circuit branch containing an added capacitance so connected between one of the supply conductors and ground that it produces the effect on the differential current sensor of an equal number of capacitive current ampere turns with a polarity opposite to that due to the known downstream capacitance. The two effects cancel. To accomplish this the added capacitance in the auxiliary circuit branch should be proportioned to the known downstream capacitance, although the two capacitances need not be necessarily be equal to each other to produce an equal and offsetting number of ampere turns.

In another embodiment, the advantages of vector cancellation or neutralization of pseudo-fault signals are achieved by one or more auxiliary circuit branches applying an opposing signal from each hot line via a resistance divider to an input terminal of an amplifier connected to the output of a differential current sensor. The values of the impedances in the auxiliary circuit branches are adjusted so that the amplitudes of the pseudo-fault signal and the cancellation signal at the amplifier input are made substantially equal.

One consequence of this utilization of a neutralization or counterbalancing principle is to purge the ground fault sensor of spurious signals at a point prior to detection, thereby producing a relatively high signal-to-noise ratio. Another consequence is to extend the advantages of the detection of true, i.e., resistive, ground fault signals to polyphase power systems where quadrature signal elimination by phase comparison techniques may present special difficulties.

BRIEF DESCRIPTION OF THE DRAWINGS

FIG. 1 is a schematic diagram of a preferred form of ground fault protective system constructed in accordance with this invention and applied to a three-phase power system, wherein the effects of reactive currents to ground in the downstream power lines are neutralized prior to detection by balancing fluxes in a differential current sensor;

FIGS. 2, 3, 4 and 5 are simplified schematic drawings representing other ground fault protective systems constructed in accordance with this invention and illustrating different modes of circuit connections which may be employed to obtain balancing of fluxes in a differential current sensor;

DETAILED DESCRIPTION

Figure 6:
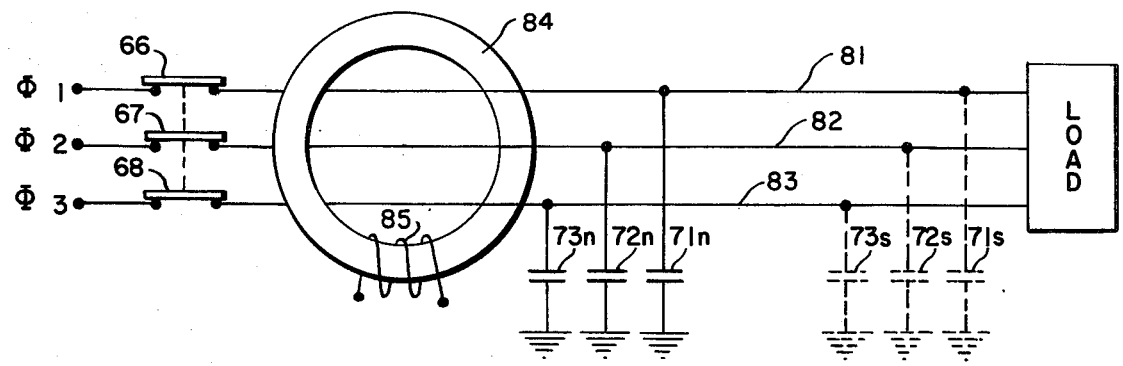
FIG. 6 is a simplified schematic drawing representing another embodiment of the invention specifically applicable to polyphase systems, wherein neutralization of downstream unbalanced reactances to ground is accomplished by auxiliary downstream circuit branches incorporating additional balancing reactances to ground.

FIG. 1 illustrates an embodiment of the invention in accordance with what I believe to be the best made known to me at this time. Three-phase 60 Hz electrical power is supplied over power lines 10, 11, and 12 from a source represented as a corner-grounded delta supply 13, line 12 being grounded at the source. The power lines threading a magnetic transformer core 14 of a differential current sensor function as primary windings and terminate downstream in a load 15. As long as the currents in the power lines are balanced, the instantaneous currents in the supply lines result in no net flux being induced in core 14. Any unbalance in the power line currents as a result of a ground fault tends to induce a flux in the core, which flux results in a ground fault-characterizing signal being produced in secondary winding 16. This signal is applied as an input to signal processing network 17 where it is amplified, rectified and integrated to produce an output potential at point 18. When the output potential at point 18 exceeds a predetermined threshold value, it triggers two serially connected solid-state devices 20 and 21, thereby energizing the winding 22 of a circuit interrupter to break the associated contacts 22 through which the power lines are connected.

A ground fault characterizing signal appearing across secondary winding 16 is applied as an input signal to the signal processing network 17 through two inductors 23 and 24. Although these inductors exhibit a small impedance to a 60 Hz signal, the disadvantage of this modest attenuation of the primary signal is more than offset by the high impedance which they present to high frequency transients. With such inductors at the output of the secondary winding 16 it should be unnecessary to provide electrostatic shielding for the transformer. The input signal is applied to operational amplifier 25 which, because of its feedback connection containing resistor 26 and capacitor 27 in parallel, presents a virtual short circuit to the input signal. The current in the feedback path flows primarily in resistor 26, the capacitor 27 having a substantial reactance at line frequency, to reduce the gain of the operational amplifier by negative feedback to frequencies still higher than the line frequencies.

If the input chokes 23 and 24 have a D.C. resistance of about one ohm apiece and feedback resistor 26 a value of 1000 ohms, the D.C. gain provided by the operational amplifier approximates 500 to one. Typical operational amplifiers may have an input offset potential of plus or minus 6 milli-volts, in which case the output signal may have a D.C. offset of plus or minus 3 volts. To eliminate this D.C. component the output signal from operational amplifier 25 is coupled through capacitor 28 to a full-wave detector 29.

Underwriter Laboratories Specifications for Ground Fault Interrupting Systems operating on 120 volt circuits require a trip time of less than 25 milliseconds for fault currents of 264 ma. Trip times for fault currents in excess of 264 ma are not — at this time — specified. When ground fault detection is applied to higher voltage systems such as 480 volt three-phase power systems (a particular concern and application of the present invention), one might expect a need for even faster response times. The full-wave detector used in FIG. 1 was developed in anticipation of such a need.

All half-wave detectors and many full-wave detectors can introduce a half-cycle delay before fault signal integration can commence if the fault starts on the worst case half-cycle of the power frequency. With the 60 Hz power frequency generally used in the United States a half-cycle is 8.33 milliseconds duration. It is clear that if the 25 millisecond requirement is made more stringent the half-cycle delay inherent in many ground fault detectors may be troublesome; the time remaining for physical functions such as signal integration and contactor release may no longer be sufficient.

The full-wave detector 29 is shown connected in the manner of an absolute value rectifier circuit with one diode 31 being connected from the output to the input of operational amplifier 30 through resistor 32 and another diode 33 opposite in polarity being connected from the output to the input without an added resistance in series with it. Not only does this full wave detector deliver an instant response regardless of the phase on which a ground fault first begins to occur, but it has the added advantage of not requiring the use of a transformer for phase-splitting. The output of the detector appears at point 34 as a series of negative half sine-waves with a 120 Hz fundamental frequency. This output signal is preferably applied via resistor 35 to a signal integrator 36.

The particular signal integrator shown is of a type described and claimed in my aforesaid U.S. Pat. No. 4,024,435. This type of integrator performs the function of integrating the input signal at a variable rate which depends upon the absolute value of the input signal. Low level signals have the longest integration rate while higher level signals are integrated at disproportionately augmented rates. Signal integration is not absolutely necessary to the practice of the present invention. I find it important, however, to include it in this form within a circuit constructed according to the best mode currently contemplated of practicing this invention. To provide variable rate integration the operational amplifier 37 of the integrator 36 is provided with a feedback path containing two series-connected integrating capacitors 40 and 41. Shunting the combination of the capacitors is resistor 42 while a further resistor 43 shunts capacitor 41 alone.

This signal processing network delivers a negative train of half-sine waves in the case of a sinusoidal fault or a zero signal if no fault or input signal is present. Inevitably some background noise may be present in any system and the integrator output should be zero under these background conditions. For this purpose a small bias potential is applied to one of the terminals of the integrator input. With no input signal to the signal processing network the integrator output is close to the minus 15 volt potential power supply.

In this embodiment the output of the integrator is applied to a solid-state switching device 20, here shown as a silicon three-layer bilateral trigger diode such as the Motorola 1N 5758. This device switches to a conductive state when the potential difference across it exceeds 20 volts. Since the minimum output of the integrator in the absence of a ground fault is less than 15 volts the trigger diode 20 is normally nonconductive. When triggered by an output signal exceeding its threshold, it triggers SCR 21 into conductivity and energizes the winding 22 of the circuit breaker. Current limiting resistor 44 prevents damage to the sensitive gate of SCR. The diode 45 across the circuit breaker winding prevents voltage transients from retriggering the SCR or even destroying it when current is interrupted by the action of the circuit breaker. A similar protective function is provided by the snubbing circuit containing resistor 46 and capacitor 47 in series across the SCR.

In the embodiment of FIG. 1 are shown three line-to-ground capacitors 50s, 51s and 52s representing the values of stray downstream capacitance to ground from each of the respective power lines 10, 11 and 12. If the power source were a symmetrical source such as a four-conductor center-grounded wye-connected generator and if each of the downstream line-to-ground capacitance values were equal, the purely reactive currents due to the downstream capacitance would give rise to no net flux in the core structure and therefore no ground fault signal. Polyphase systems are not all symmetrical, however. Even when they are symmetrical the downstream capacitance values to ground are not necessarily equal. In systems powered from an asymmetrical source such as the corner-grounded delta shown here, even when the downstream capacitance values are equal and in the absence of a true ground fault a net current differential may still result which would be detected by the differential current sensor. This results from the fact that there is typically a larger capacitance current to ground from the two hot lines than from the neutral line.

This embodiment of the invention involves the neutralization of the effects of such purely reactive line-to-line ground currents by the provision of one or more auxiliary circuit branches containing additional reactance so connected between the supply lines and ground as to exert an equal and opposite counterbalancing effect on the differential current sensor. The auxiliary circuit branches are shown in FIG. 1 to comprise capacitors 50n, 51n and 52n, each connected to ground from a power line upstream of the sensor via a common auxiliary winding 53. Winding 53 is coiled on the core to produce an effect opposite to that of a net reactive differential current in the supply conductors.

It will be shown below that there are a number of variations in the manner in which the auxiliary circuit branches may be connected from the supply line to ground or to neutral, whether upstream or downstream of the differential current sensor and whether with or without an auxiliary winding on the current sensor. In this preferred embodiment, however, it can be graphically seen how any tendency toward the generation of a new flux in the current sensor by a capacitance current flowing to ground through capacitor 50s will be offset by a current flowing in the neutralizing capacitor 50n to produce an equal number of ampere turns of opposite effect. In the simplest theoretical case the values of capacitor 50s and capacitor 50n would be equal and the primary and auxiliary windings would have the same number of turns. In a more practical embodiment, however, the auxiliary winding 53 has more turns than those of the primary winding and capacitor 50n is proportionately smaller in value. Neutralizing capacitor 50N is therefore proportional in value to the downstream capacitance and produces an effect on the differential current sensor equal and opposite to the ampere turn effects of the downstream capacitance 50s. The same is true of the equivalent neutralizing capacitors 51n and 52n with respect to the capacitance represented by downstream capacitances 51s and 52s.

The differential transformer can be temporarily densensitized by a large fault current saturating its core. This phenomenon is not troublesome in the case of "true" faults because the circuit interruption allows time for the core to recover its permeability. However, simply energizing the downstream stray capacitances or the neutralizing capacitors alone can produce heavy current surges which can either make circuit closure without nuisance tripping difficult or render the system insensitive at a critical moment. It is important therefore that the load cabling and the neutralization circuits be energized simultaneously by a contactor upstream of both. The dynamic impedances of the auxiliary neutralization circuit branches and the downstream stray capacitance circuits should be reasonably matched. When pure capacitors are used for neutralization, the initial current drawn by them upon contactor closure is limited only by the impedance of the power lines, whereas the current drawn by the downstream strays is limited by the cable inductance and resistance. For a few microseconds the system can be over-neutralized.

If the stray capacitances requiring neutralization are due to a long uniform cable as is the case with electrically powered center-pivot irrigation systems or systems powering mining equipment, an important first approximation to matching is to place resistors 54n, 55n and 56n in series with each neutralizing capacitor. The value of each resistance should be half that of the corresponding cable conductor modified by the turns ratio between the neutralization and the power circuits.

A second approximation — less important than the resistance equalization — is made by adding inductors 57n, 58n and 59n (generally on the order of a few microhenries) in series with each neutralizing capacitor and its matching resistor. The inductors compensate for the transmission time for the line voltage to travel down the cable; not all of the stray capacitance is energized at the same time. This effect is generally of no consequence in 60 Hz systems except where there are very long downstream cables.

Additional elements could be added to the auxiliary neutralization circuits to improve the match of dynamic characteristics beyond that given by the series resistance and inductor but they have not been found to be necessary in practical systems thus far encountered.

While this invention has particular value in connection with polyphase supply systems, its utility is certainly not limited thereto. In fact, precisely because the invention lends itself to being applied phase-by-phase to the neutralization of the effects of reactive ground currents on a current sensor, it is equally applicable to single phase as to polyphase systems. To conceptualize the variety of ways in which the invention may be carried out in practical examples, it may be particularly instructive to examine different modes of its implementation in connection with single-phase systems. FIGS. 2, 3, 4 and 5 are simplified schematic drawings with the same reference characters denoting equivalent features in each drawing.

FIG. 2 illustrates a simple conceptualization of the invention as applied to a single-phase system. The core structure 60 of a differential current sensor is shown traversed by power lines functioning as single-turn primary windings, a secondary winding 61 being provided to detect any flux change in the core structure. Cs represents the downstream stray capacitance to ground of the ungrounded or hot power line, while Cn represents the neutralizing capacitance connected in an auxiliary circuit branch from the hot line upstream of the sensor to the neutral line downstream of the sensor.

This system resembles a bridge circuit with Cn equal to Cs. Any capacitive current flow to ground, Is, through stray capacitance Cs tends to produce a flux in the core structure, but an equal and opposite current, In, flows through the auxiliary circuit branch containing neutralizing capacitor Cn. Hence no signal appears across the secondary winding, because the two capacitive currents result in an ampere-turn influence on the core structure substantially equal and opposite to each other. It is to be noted here that the connections of the auxiliary circuit branch are downstream of the circuit breaker contacts to insure that when the circuit is initially completed both capacitive currents begin to flow simultaneously.

FIG. 3 shows a similar circuit except that the value of the neutralizing capacitance is reduced by one half by adding a one-turn winding 63 in series with Cn. The value of Cn can be halved, since the current in Cn flows in two one-turn windings (one power line plus winding 63) whereas the current in Cs flows in but one.

Similar proportioning of the neutralizing capacitance Cn can be obtained, as shown in FIG. 4, by connecting it from the hot line upstream of the sensor via a two-turn auxiliary winding 64 directly to ground. In this case the neutralizing current In does not traverse the core structure via either power line.

The example represented by FIG. 5 is not a preferred embodiment, although it functions as effectively as the others. Here the auxiliary circuit containing the neutralizing capacitor Cn is connected from the hot line downstream of the sensor via a two-turn auxiliary winding 65 to ground. Solely because of the nature of the auxiliary circuit connections the value of Cn is not redued compared to that of Cs, even though a two-turn auxiliary winding is employed. This is because the ampere turns resulting from the neutralizing current In in the auxiliary winding must offset not only those due to the stray capacitance current Is but also those due to the flow of the neutralizing current via the hot line.

From the latter example can be seen the importance of carefully selecting the connection points of the auxiliary circuit branch to suit the system. If the auxiliary circuit branch containing the neutralizing impedance is properly arranged with the use appropriate multi-turn auxiliary windings on the core structure, the size of the neutralizing impedance can be kept appropriately small. Each of the single-phase circuits shown in FIG. 2 through 5 has, of course, its polyphase counterparts. In general, the auxiliary circuit branch or branches containing the neutralizing impedances should be connected to a hot line or hot lines downstream of the circuit breaker; otherwise the starting current tends to trip the circuit breaker or prevent its closure.

In FIG. 6 is illustrated a simplified schematic embodiment of the invention wherein neutralization is accomplished by one or more auxiliary circuit branches with neutralization reactances connected to the load lines entirely downstream of the differential current sensor. This embodiment is applicable to polyphase systems including the so-called single-phase 3 wire systems. Three-phase power lines 81, 82 and 83 here pass through the core structure 84 of a differential transformer encircled by a secondary winding 85. Downstream the load lines exhibit stray reactances to ground represented by capacitances 71s, 72s and 73s, not necessarily equal in value to each other. In the special case where the three-phase voltages are equal, the desired balance condition is obtained when the capacitances from each line to ground are equal to each other. Neutralization capacitors 71n, 72n and 73n are connected from the respective load lines to ground to equate the capacitances to ground on each downstream line. Although three neutralization capacitors are shown for illustration purposes, no capacitance needs to be added to the power line having the largest stray capacitance to ground. With equal voltages on each power line and equal downstream total reactance to ground, no net flux is induced in core structure 84 in the absence of a true ground fault to trip the circuit breaker contacts 66, 67 and 68.

In practical applications the line voltages are not exactly equal, and for perfect balance the values of the neutralizing capacitors 71n, 72n and 73n should be adjusted to achieve balance of the downstream reactive currents to ground. Those lines having lower voltages should have lower total impedance to ground, so that the ratio of the voltage to the total impedance to ground on one hot line substantially equals the ratio of voltage and impedance to ground on each of the other hot lines.

The embodiment of FIG. 6 may be suitable in some applications, but is not preferred, because in most installations the voltage on a given line is not fixed, but fluxtuates — sometimes over a substantial range. Variations in voltage on any one line can therefore upset the balance intended to be achieved by the addition of the neutralizing capacitors. The embodiment of FIG. 6 should, for optimum performance, be rebalanced by the addition or subtraction of neutralizing capacitors whenever the line-to-line voltage changes. By contrast, the embodiments of FIGS. 1 through 5 adapt automatically to variations in voltage between phases and require no rebalancing to neutralize the effects of downstream reactances to ground.

Each of the previously described embodiments achieves neutralization of the effects of downstream reactances to ground by the cancellation of net fluxes in a differential current sensor. This invention is not, however, limited to flux cancellation techniques. Neutralization can be accomplished at any point in the system up to the point of actual detection or demodulation of the fault signal.

Figure 7:
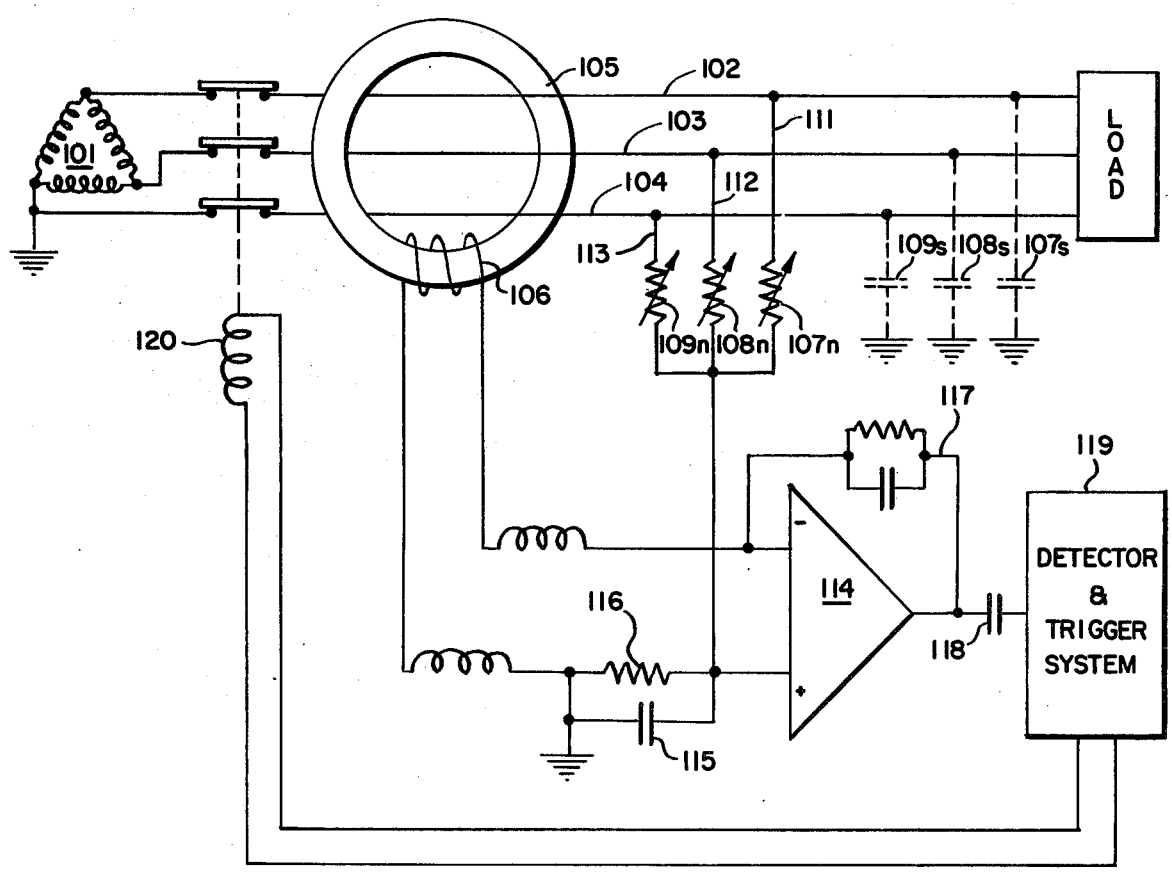
FIG. 7 is a schematic diagram of an alternate form of ground fault protective system constructed in accordance with this invention, wherein the effects of reactive currents to ground in the downstream power lines are neutralized prior to detection by applying balancing potentials derived from the power lines to obtain cancellation of pseudo-fault signals received from a differential current sensor.

Another preferred approach to counterbalancing or neutralizing the effects of reactive ground currents is shown in the embodiment of FIG. 7 wherein neutralization is accomplished at the output of a differential current sensor. Here again a corner-grounded delta supply 101 is shown energizing three-phase power lines 102, 103, and 104 connected to a load. The power lines pass as primary windings through a toroidal magnetic core structure 105 encircled by a secondary winding 106 to sense any differences in currents carried by the supply conductors. Again, each of the supply lines exhibits a measurable predetermined reactance to ground represented by capacitances 107s, 108s and 109s.

In this example there are three auxiliary circuit branches 111, 112, 113 each connected at one end to a respective one of the load conductors. These circuit branches contain neutralizing resistors 107n, 108n and 109n instead of the capacitors shown in the previous examples and do not result in flux cancellation in the differential transformer. Whereas the secondary winding 106 applies a signal to the inverting terminal of operational amplifier 114, the auxiliary circuit branches are connected to the noninverting terminal to neutralize, offset or balance any pseudo-fault signal applied to the other amplifier terminal. That is to say that the signal applied to one amplifer input terminal from each power line via its neutralizing resistor is equal in phase and amplitude to the pseudo-fault signal derived from the same power line because of its downstream reactance to ground and applied to the opposite input terminal. The two inputs balance each other.

In applying the neutralizing signal to the amplifier input it is important to ensure that the phase relationship to the pseudo-fault signal is as closed to 180° as possible. Capacitor 115 connected to ground from the noninverting amplifier input in parallel with resistor 116 is there for the purpose of delaying the neutralizing signal a few degrees to bring the two signals into phase opposition for near-perfect cancellation. The neutralizing resistors 107n, 108n and 109n are adjustable to make the output of amplifier zero when there are no true fault currents in the system. Larger stray capacitances require neutralizing resistors of smaller values, i.e., the impedance of a compensating resistor is proportional to the impedance of the respective downstream reactance to ground. This is not to say that the two impedances are closely related in absolute value; the resistance values may be on the order of a megohm or more and they draw very small currents. To ensure that even these small currents do not traverse the core structure 105, the auxiliary circuit branches may be connected upstream of the differential current sensor. The connection points should nevertheless be downstream of the circuit breaker contacts. When the value of one of the compensating resistors 107n, 108n or 109n has been properly adjusted for its phase to provide a null signal at the amplifier output, it does not need to be readjusted thereafter, either as a result of further neutralization adjustments to the other phases or as a result of changes in voltage on one or more of the power lines.

When this type of neutralization is applied to three or more ungrounded power lines it is possible to achieve perfect balance without the phase shift alignment provided by capacitor 115. In that event, however, the adjustments of the neutralizing resistors are mutually dependent, and iterative adjustment is required. A proper value for capacitor 115 simplifies the adjustment procedure.

A true fault signal applied to the amplifier 115 with pseudo-fault signals neutralized finds a low impedance amplifier by virtue of the feedback path 117 containing, preferably, a parallel combination of a resistor and a capacitor. The amplified fault signal is coupled through capacitor 118 to a detector and trigger system 119, the output of which energizes winding 120 of the circuit breaker to disconnect power from the supply lines.

Although neutralization circuits of the types shown in FIGS. 1 through 6 are not affected by phase-shifts which may occur in the differential current sensor or in the subsequent electronics, it is important with post-transformer neutralization circuits such as that shown in FIG. 7 to ensure that the phase-shift of the fault signal remains constant once the neutralization adjustment has been made. The kind of differential transformer most used in contemporary ground fault circuit interrupter systems can be a fickle component in this respect. Permeability of the core material varies widely with temperature and with the recent flux history of the core; such influences cause the transformer phase-shift to change and thus frustrate the maintenance of post-transformer neutralization.

I have found that differential current transformers terminated by a substantially "zero impedance" amplifier such as those shown in FIGS. 1 and 7 are substantially free of changes in phase-shift. Such circuits are therefore ideal for use in systems wherein the integrity of the fault signal phase is important. When the transformer secondary winding is input to a very low impedance current amplifier, the effect is as if the winding were short circuited. This resists flux changes which may be induced in the core material by the other windings. As long as the dynamic range of the amplifier (25 in FIG. 1, 114 in FIG. 7) is not exceeded, the core structure will not suffer large flux excursions or a loss in permeability, even with the shock of a large and sudden differential current. This immunity to de-sensitization together with the inherent stability of phase-shift makes the combination of the differential current transformer with a very low input impedance current amplifier particularly useful in connection with post-transformer neutralization circuits.

Current transformers operating in this mode deliver more current as the number of secondary turns is decreased to a point where the open-circuit secondary voltage is insufficient to overcome the circuit losses (the impedance of the amplifier is not truly zero). I find that maximum sensitivity to fault signals with such circuits is obtained with 15 turns on a standard GFI core, Type 5026-P8014 manufactured by Magnetic Metals, Inc., Camden, N.J. In conventional GFI circuits this core is used with several thousand turns. Aside from their poor performance with respect to phase shift, transformers with many turns cost more money.

Another feature which I find very useful in the embodiments illustrated herein is the use of a transformer secondary wound as a so-called regressive winding. This is suggested by the nature of the drawing of secondary 16 in FIG. 1, some of the winding turns being omitted to avoid confusion with winding 53. The typical toroidal winding in common use can be very sensitive to external field influences, because in addition to its inductive association with the core structure it responds and radiates as a single-turn loop in its 360° path around the core structure. If instead the secondary is wound in two sections half of which progresses 360° around the core structure with the other half regressing back to the starting point, the result is a winding which neither radiates nor responds to external fields. Each turn is paired with its complement from the other end of the winding as in a bifilar winding. But unlike the bifilar winding, each turn is series aiding with respect to the core flux. Each pair of turns is self-cancelling with respect to exterior flux.

Many other variations in the implementation of this invention are possible in addition to those specifically shown and described. It should be understood that the foregoing examples are offered in an illustrative sense and the details of these embodiments should not limit the scope of this invention in its broader aspects.

I claim:

1. A ground fault protective system for use with a power distribution system for supplying a.c. power to a known load from at least two supply conductors, at least one of said supply conductors exhibiting a measureable downstream reactance to ground giving rise to net reactive differential currents in said supply conductors not characteristic of a real ground fault comprising:

differential current sensing means responsive to currents in said supply conductors for generating fault signals representing differential currents carried by said supply conductors; and neutralizing means comprising at least one auxiliary circuit branch including predetermined impedance means so connected to at least one of said supply conductors and proportioned relative to said downstream reactance to ground as to exert a neutralizing effect on said net reactive differential currents substantially counterbalancing the effect on said fault signals of said downstream reactance to ground.

2. A ground fault protective system in accordance with claim 1 wherein said impedance means in said auxiliary circuit branch comprises reactance proportional in value to said downstream reactance and wherein said auxiliary circuit branch is connected to exert an effect on said differential current sensing means substantially equal and opposite to the effect of said downstream reactance.

3. A ground fault protective system in accordance with claim 2 wherein said differential current sensing means comprises a differential current transformer with said supply conductors functioning as primary windings and with a secondary winding for generating fault signals; and wherein said auxiliary circuit branch exerts an ampere-turn effect on said differential current transformer offsetting the ampere-turn effect of said downstream reactance to ground.

4. A ground fault protective system in accordance with claim 3 wherein said auxiliary circuit branch comprises an auxiliary winding on said current transformer.

5. A ground fault protective system in accordance with claim 1 wherein said power distribution system is polyphase, and wherein each of said auxiliary circuit branches is connected to ground from one of said supply conductors downstream of said current sensing means, and wherein said predetermined impedance is proportional to the net imbalance of said measurable downstream impedance.

6. A ground fault protective system in accordance with claim 5 wherein the ratio of the voltage to the total impedance to ground on one of said ungrounded supply lines is substantially equal to the ratio of the voltage to the total impedance to ground on each of the other ungrounded supply lines.

7. A ground fault protective system in accordance with claim 1 wherein said impedance means in said auxiliary circuit branch comprises resistance proportional in value to said downstream reactance and wherein said auxiliary circuit branch is connected to the output of said differential current sensing means to provide a neutralizing signal equal to and 180° out-of-phase with the fault signal component due to said downstream reactance.

8. A ground fault protective system in accordance with claim 7 wherein said auxiliary circuit branch including proportional resistance further includes phase-compensating reactance to adjust the phase of said neutralizing signal with respect to the fault signal component due to said downstream reactance.

9. A ground fault protective system in accordance with claim 7 wherein said differential current sensing means comprises a differential current transformer with said supply conductors functioning as primary windings and with a secondary winding for generating fault signals, said secondary winding having a relatively low turns ratio to produce a low voltage high current output signal; and wherein an operational amplifier having a feedback circuit to provide impedance close to zero is connected to amplify said output signal, thereby providing a signal substantially free of phase shift.

10. A ground fault protective system for use with a power distribution system for supplying a.c. power to a known load from at least two supply conductors, at least one of said supply conductors exhibiting a measurable capacitance to ground, comprising:
   differential current sensing means comprising a magnetic core structure having a plurality of primary windings inductively associated therewith, each connected in series with one of said supply conductors, and at least one secondary winding thereon for generating ground-fault-characterizing signals in response to net magnetic fluxes induced in said core structure as a result of differential currents in said primary windings;
   circuit breaker means for interrupting continuity in said supply conductors;
   detector means having an output circuit for tripping said circuit breaker and an input circuit for receiving fault signals from said secondary winding; and
   means for minimizing spurious signals in said secondary winding as a result of said stray capacitance from one of such supply conductors to ground, comprising auxiliary circuit means having balancing capacitance therein proportioned to the value of said measurable capacitance and so connected to at least one of said supply conductors as to result in an ampere-turn influence on said core structure substantially equal and opposite to the effect thereon of said measurable capacitance to ground.

11. A ground fault protective system for use with a power distribution system for supplying a.c. power to a known load from at least two supply conductors, at least one of said supply conductors exhibiting a measurable stray capacitance to ground, comprising:
   differential current sensing means comprising a magnetic core structure having a plurality of primary windings inductively associated therewith, each connected in series with one of said supply conductors, and at least one secondary winding thereon for generating ground-fault-characterizing signals in response to net magnetic fluxes induced in said core structure as a result of differential currents in said primary windings;
   circuit breaker means for interrupting continuity in said supply conductors;
   detector means having an output circuit for tripping said circuit breaker and an input circuit for receiving fault signals from said secondary winding; and
   means for cancelling spurious signals induced in said secondary winding as a result of said stray capacitance from one of such supply conductors to ground, comprising an auxiliary circuit branch having a balancing resistance therein proportioned to the reactance of said stray capacitance and so connected between said one supply conductor and the input circuit of said detector to neutralize said spurious signals prior to their introduction into said detector means.

12. A ground fault protective system for use with a power distribution system for supplying a.c. power to a known load from polyphase supply conductors, at least one of said supply conductors exhibiting a measurable stray capacitance to ground, comprising:
   differential current sensing means comprising a magnetic core structure having a plurality of primary windings inductively associated therewith, each connected in series with one of said supply conductors, and at least one secondary winding thereon for generating ground-fault-characterizing signals in response to net magnetic fluxes induced in said core structure as a result of differential currents in said primary windings;
   circuit breaker means for interrupting continuity in said supply conductors;
   detector means having an output circuit for tripping said circuit breaker and an input circuit for receiving fault signals from said secondary winding; and
   means for minimizing spurious signals in said secondary winding as a result of said stray capacitance from such supply conductors to ground, comprising an auxiliary circuit branch having a balancing capacitance therein proportioned to the net imbalance of said stray capacitance and so connected between at least one of said supply conductors and ground downstream of said differential sensing means as to result in a ratio of voltage to capacitive impedance to ground on one ungrounded supply conductor substantially equal to the ratio of voltage to capacitive impedance to ground on each of the other supply conductors.

* * * * *